United States Patent [19]

Wakabayashi et al.

[11] Patent Number: 5,105,997
[45] Date of Patent: Apr. 21, 1992

[54] FILLING NOZZLE HAVING A TUBE HOLDING PORTION FOR HOLDING A RUBBER TUBE

[75] Inventors: Shigeru Wakabayashi; Yoshihiro Saijo; Yoshitaka Yamane; Yasuji Fujikawa, all of Tokushima, Japan

[73] Assignee: Shikokukakoki Co., Ltd., Tokushima, Japan

[21] Appl. No.: 570,461

[22] Filed: Aug. 21, 1990

[30] Foreign Application Priority Data

Aug. 24, 1989 [JP] Japan ................ 1-98946[U]

[51] Int. Cl.⁵ .................................... B65D 25/40
[52] U.S. Cl. .................................... 222/494; 222/571; 222/574; 222/575; 239/570; 239/DIG. 12
[58] Field of Search ............... 222/491, 494, 566, 567, 222/571, 574, 575; 239/546, 570, 602, DIG. 12; 285/328, 330

[56] References Cited

U.S. PATENT DOCUMENTS 3,254,869 6/1966 Easey ..................... 239/546 X
4,109,836 8/1978 Falarde .................... 222/494
4,877,160 10/1989 Derving ................... 222/494

Primary Examiner—Kevin P. Shaver
Assistant Examiner—Joseph A. Kaufman
Attorney, Agent, or Firm—Armstrong, Nikaido, Marmelstein, Kubovcik & Murray

[57] ABSTRACT

A filling nozzle includes a vertical tubular nozzle body for receiving the liquid to be filled and supplied thereto forcibly and intermittently, and a rubber tube connected to the lower end of the nozzle body and having an opening at its lower end. The rubber tube is folded at required portions to constrict the opening. The opening is held closed by the elasticity of the rubber tube against gravity acting on the liquid within the nozzle body when the supply of the liquid is discontinued but is opened by the pressure of the liquid when the liquid is supplied to the nozzle body. The nozzle body is provided at its lower end with a tube holding portion having the rubber tube fitted thereover for holding the rubber tube in shape. The tube holding portion is externally in conformity with the inner surface of the rubber tube except at the folded portions.

7 Claims, 8 Drawing Sheets

FILLING NOZZLE HAVING A TUBE HOLDING PORTION FOR HOLDING A RUBBER TUBE

BACKGROUND OF THE INVENTION

The present invention relates to a nozzle for use in filling containers with a fluid food or like liquid in a specified amount in each container.

For example, Unexamined Japanese Patent Publication SHO 57-177472 discloses a filling nozzle of this type. The disclosed filling nozzle comprises a vertical tubular nozzle body for receiving the liquid to be filled and supplied thereto forcibly and intermittently, and a rubber tube connected to the lower end of the nozzle body and having an opening at its lower end, the rubber tube being folded at required portions to constrict the opening. The opening is held closed by the elasticity of the rubber tube against gravity acting on the liquid within the nozzle body when the supply of liquid is discontinued, but is opened by the pressure of the liquid when the liquid is supplied to the nozzle body.

The opening of the nozzle body at its lower end is opened or closed by deforming the folded portions of the rubber tube. With the nozzle described, however, the rubber tube is joined to the nozzle body by fitting the upper end portion of the rubber tube around the lower end of the nozzle body, so that tube portions other than the folded portions are also likely to deform. the opening of the rubber tube then will not be completely closed, permitting leakage through the opening (see FIG. 12).

SUMMARY OF THE INVENTION

The main object of the present invention is to provide a filling nozzle free of this problem.

The present invention provides a filling nozzle which is of the same type as the conventional one described above and which is characterized in that the nozzle body is provided at its lower end with a tube holding portion having the rubber tube fitted thereover for holding the rubber tube in shape, the tube holding portion being externally in conformity with the inner surface of the rubber tube except the folded portions.

With the filling nozzle of the present invention, the tube holding portion prevents the possible deformation of portions of the rubber tube other than the folded portions thereof.

Consequently, the lower-end opening of the rubber tube can be closed completely without permitting any leakage from the opening.

DESCRIPTION OF THE PREFERRED EMBODIMENTS

Embodiments of the present invention will be described below with reference to the drawings.

Figure 10:
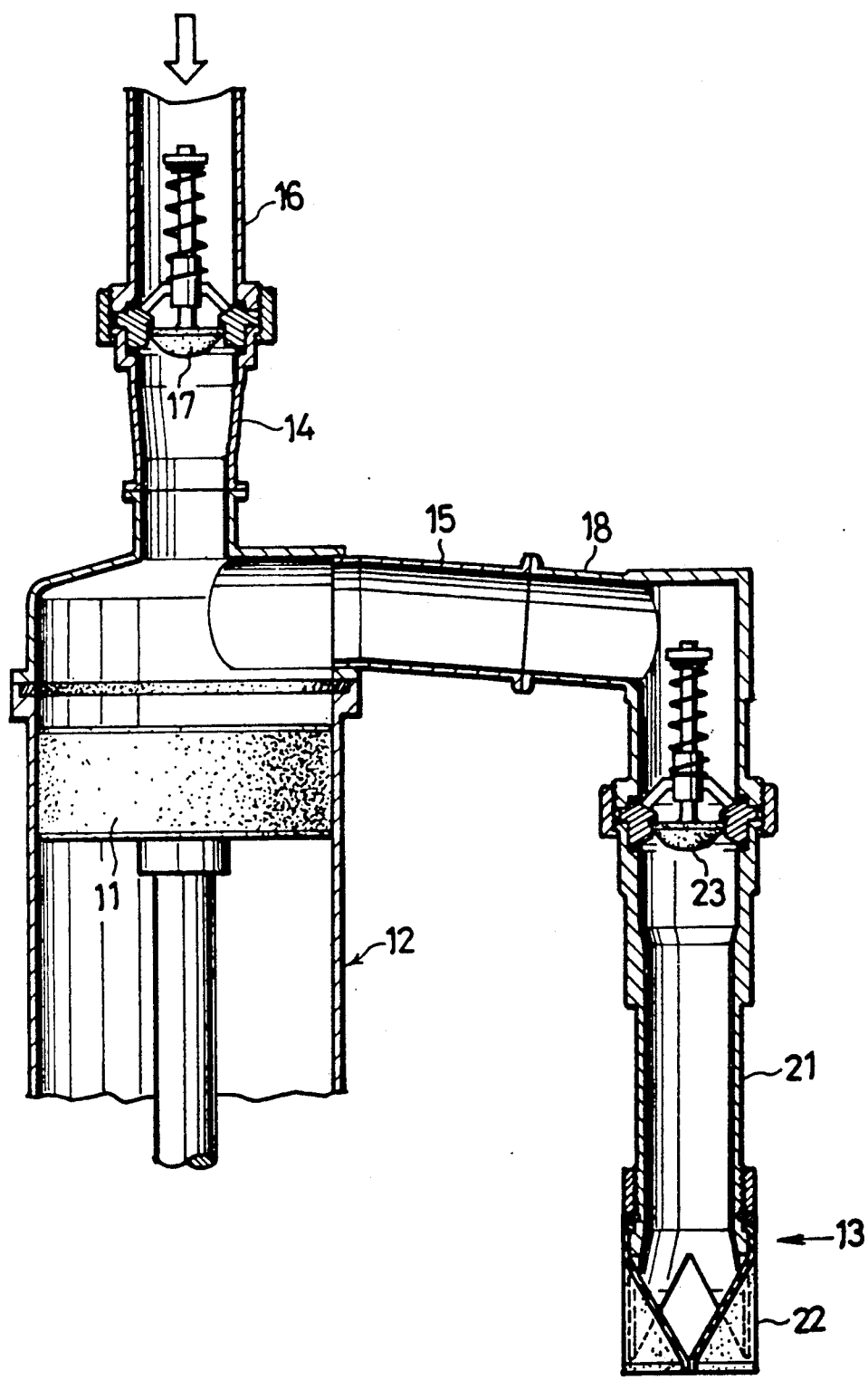
FIG. 10 is a view in vertical section showing a filling apparatus in its entirety with the filling nozzle included therein.

FIG. 10 is an overall view showing an apparatus including a filling nozzle for filling a specified amount of liquid. The apparatus comprises a vertical metering cylinder 12 housing a piston 11, and the filling nozzle, indicated at 13, for receiving the liquid to be filled and forcibly supplied thereto from the metering cylinder 12 by the operation of the piston 11.

The metering cylinder 12 is provided at its top portion with an upward inlet pipe 14 and a rightward outlet pipe 15. The inlet pipe 14 has connected thereto the lower end of a supply pipe 16 extending downward from an unillustrated liquid tank. The inlet pipe 14 has an inlet-side check valve 17 at its upper end. An inverted L-shaped connecting pipe 18 is connected at its left end to the outlet pipe 15.

The filling nozzle 13 comprises a vertical tubular nozzle body 21 connected at its upper end to the lower end of the connecting pipe 18, and a rubber tube 22 connected to the lower end of the nozzle body 21. The nozzle body 22 has a outlet-side check valve 23 at its upper end.

Figure 3:
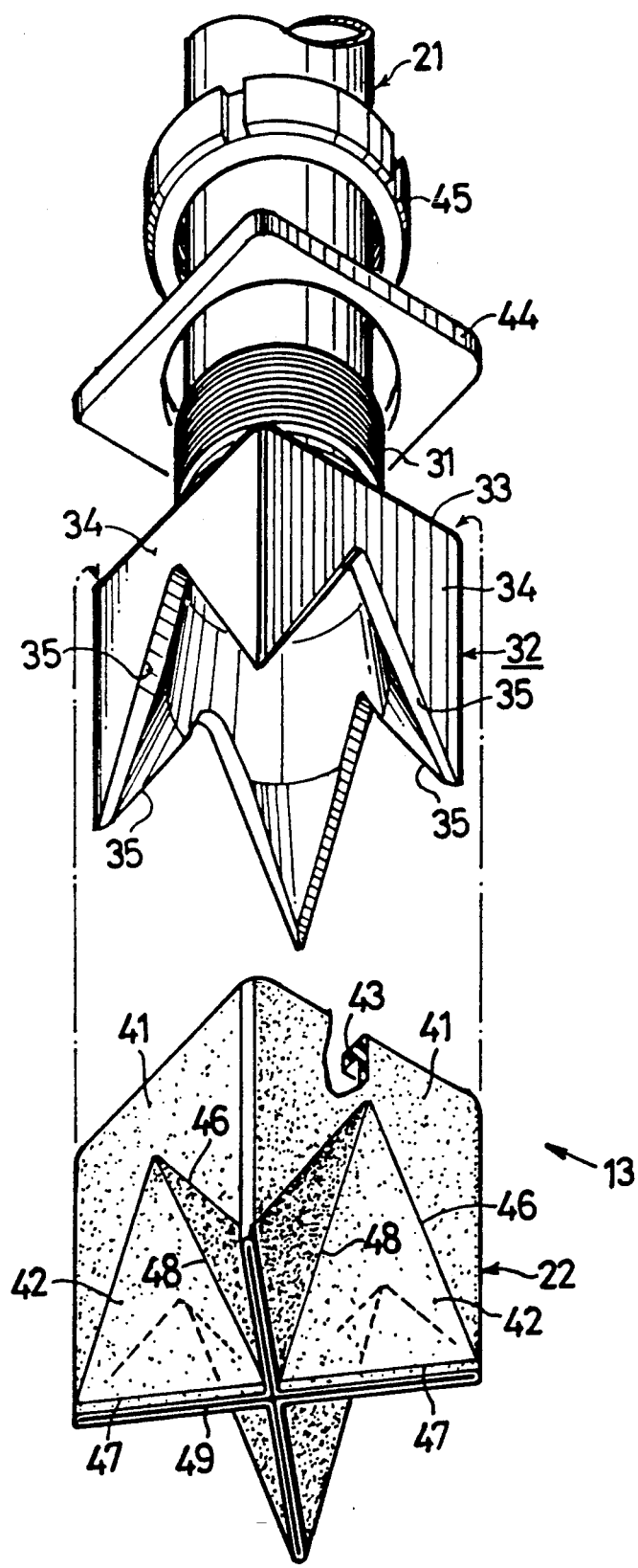
FIG. 3 is an exploded perspective view of the filling nozzle.

As shown in detail in FIG. 3, the nozzle body 21 has a male screw 31 at its lower end and a tube holding portion 32 immediately below the screw 31 for holding the rubber tube 22 in shape. In cross section, the nozzle body 21 is circular above the tube holding portion 32 but is square at the tube holding portion 32, which extends into the circular tube portion via an upward stepped potion 33. The outlet surface of the tube holding portion 32 comprises four flat faces 34 forming in cross section a square contour which has a width across flats slightly larger than the outside diameter of the circular tube portion. The tube holding portion 32 has a circular inner surface extending from its upper end approximately to the middle of its height and having a gradually increasing diameter. The circular inner surface gently changes into a square inner surface from the middle of the height to the lower end of the portion 32. Each of the four flat faces 34 is formed with an inverted V-shaped cutout 35 at the lower part of the tube holding portion 32.

The rubber tube 22 comprises four flat portions 41 fitted over the tube holding portion 32 in intimate contact therewith and internally in conformity with the four flat faces 34, respectively, and four inward folded portions 42 extending from the lower edges of the respective flat portions 41 and each extending into the cutout 35. An inward flange 43 is formed at the upper ends of the four flat portions 41 and bears on the stepped portion 33. An annular holding plate 44 fitted around the nozzle body 21 is disposed on the flange 43 and fastened thereto with a nut 45 screwed on the male screw 31. An inverted V-shaped fold 46 is formed at the boundary between the flat portion 41 and the inward folded portion 42. A horizontal fold 47 is formed along the lower edge of each inward folded portion 42. A vertical fold 48 extends from the vertex of the inverted V-shaped fold 46 to the midpoint of the horizontal fold 47. The rubber tube 22 is so folded that the lengthwise midportions of lower edges of the four inward folded portions 42 are collectively positioned on the axis of the rubber tube 22, with the half lengths of the lower edges of the adjacent inward folded portions 42 fitted to each other on their inner faces, whereby separable radial joints 49 extending from the axis in the four directions are formed at the lower end of the rubber tube 22.

Figure 1:
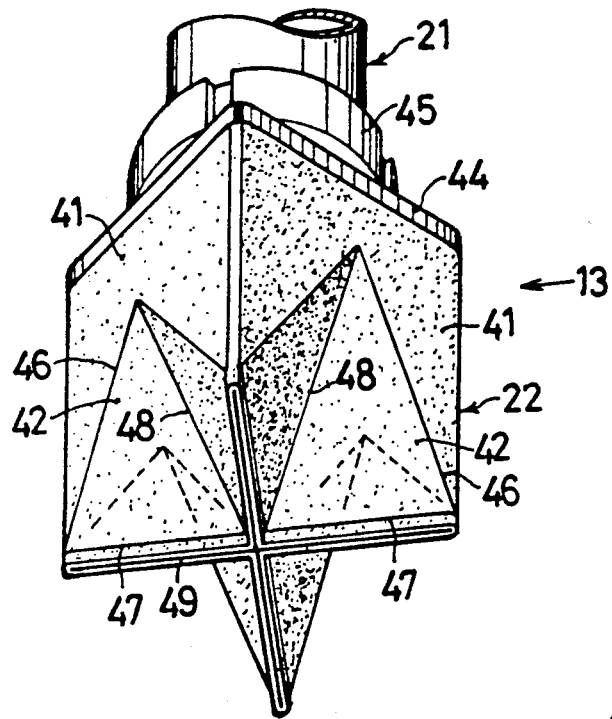
FIG. 1 is a perspective view showing a filling nozzle of the invention with its lower-end opening closed.
Figure 2:
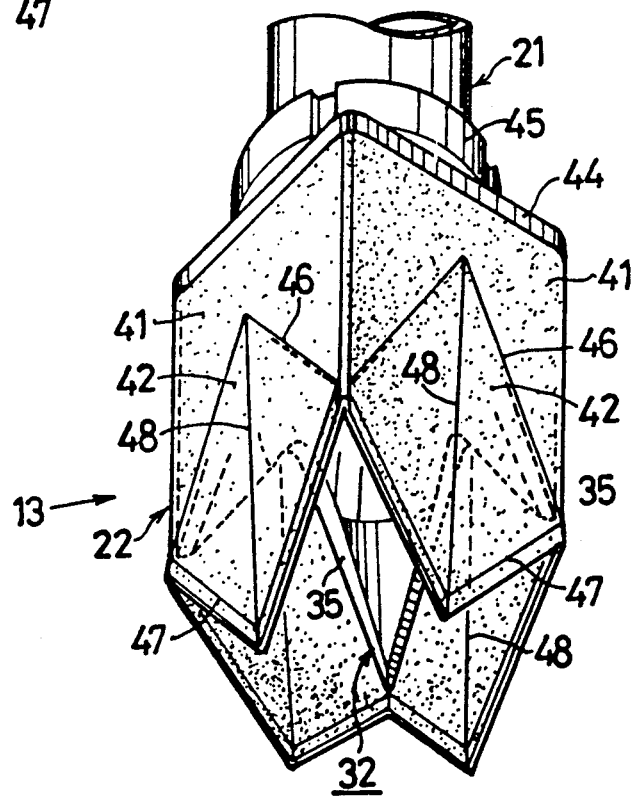
FIG. 2 is a perspective view showing the nozzle with its opening left open.

When the liquid to be filled is forced into the filling nozzle 13 from the metering cylinder 12, the inward folded portions 42 are opened outward by the pressure of the liquid to open the radial joints 49 as shown in FIG. 2 to discharge the liquid from the nozzle 13. When the supply of the liquid is discontinued, the joints 49 are closed by the elasticity of the rubber tube 22, with the result that the liquid is held in the nozzle 13 until another portion of liquid is supplied, without leaking from the joints 49.

Figure 11:
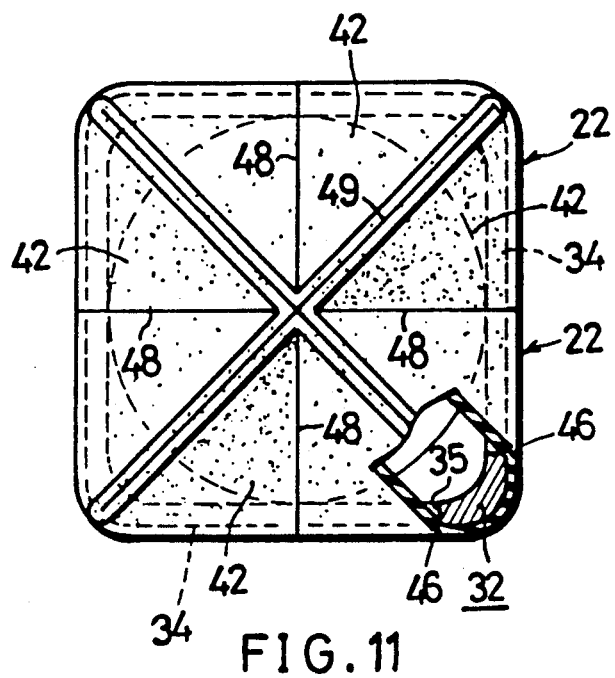
FIGS. 11 and 12 are views each showing a rubber tube as closed.
Figure 12:
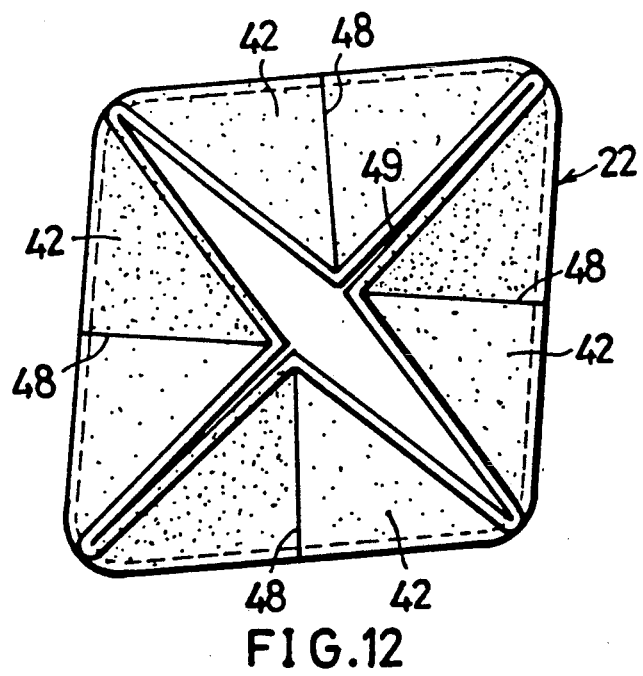

If the tube holding portion 32 is not provided, it is likely that while the joints 49 are held closed, the rubber tube 22 will be irregularly deformed at the portion thereof above the folded portions 42, failing to completely close the joints 49 as seen in FIG. 12. However, the presence of the tube holding portion 32 eliminates the failure as shown in FIG. 11.

Figure 4:
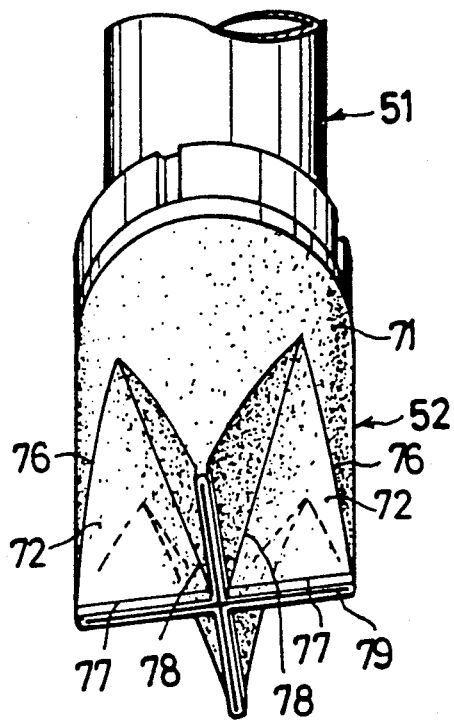
FIGS. 4 to 6 are perspective views corresponding to FIGS. 1 to 3, respectively, and showing another embodiment.
Figure 5:
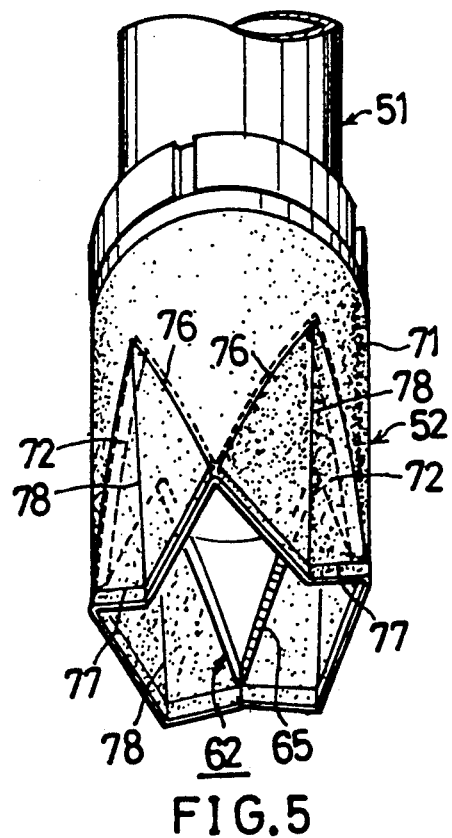
Figure 6:
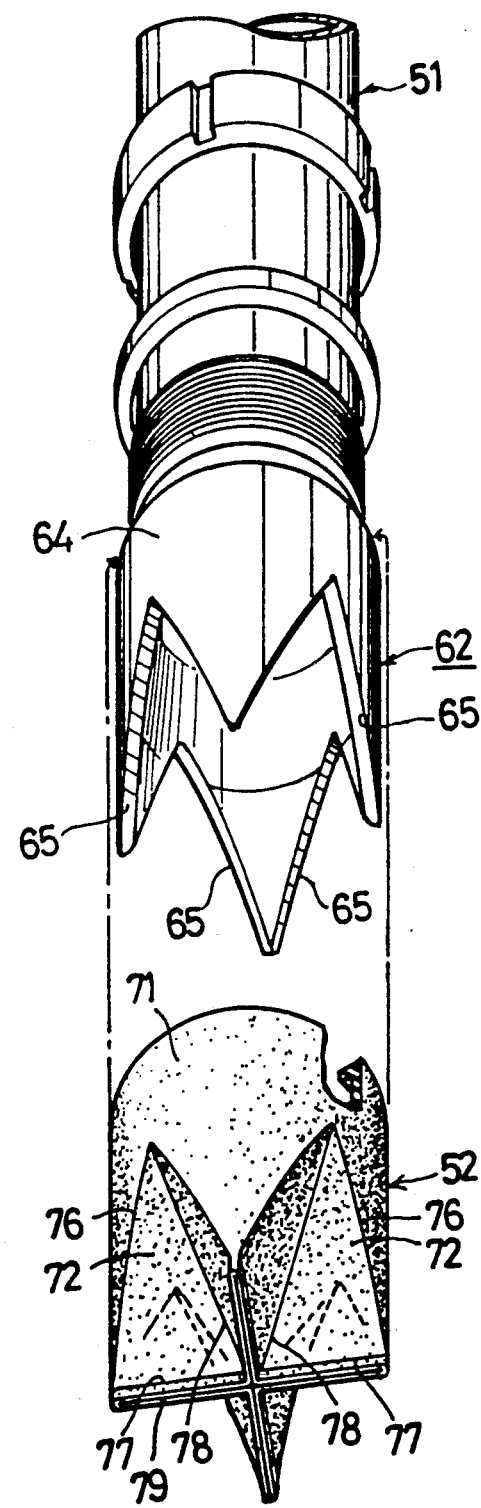

FIGS. 4 to 6 show another embodiment, which, like the above embodiment, comprises a nozzle body 51 and a rubber tube 52. A tube holding portion 62 for holding the rubber tube 52 in shape has a cylindrical outer surface 64 which is circular in cross sectional contour. The lower portion of the tube holding portion 62 is formed with four inverted V-shaped cutouts 65 which are continuous with one another. The rubber tube 52 comprises a cylindrical portion 71 fitted over the tube holding portion 62 in intimate contact therewith and internally in conformity with the cylindrical surface 64, and four inward folded portions 72 extending from the lower edge of the cylindrical portion 71 with a fold 76 formed therebetween and each extending into the cutout 65. Further as in the foregoing embodiment, each inward folded portion 72 is formed with a horizontal fold 77 and a vertical fold 78, and the rubber tube 52 is provided at its lower end with separable radial joints 79.

Figure 7:
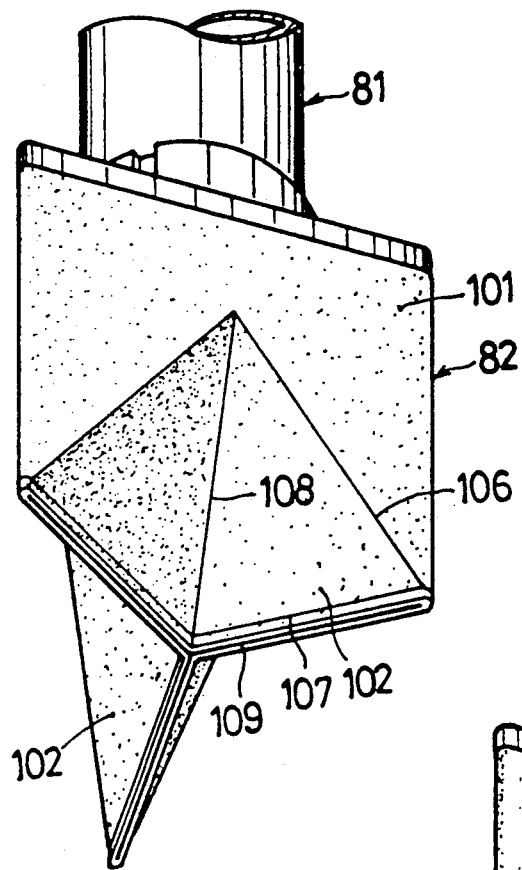
FIGS. 7 to 9 are perspective views corresponding to FIGS. 1 to 3, respectively, and showing still another embodiment.
Figure 8:
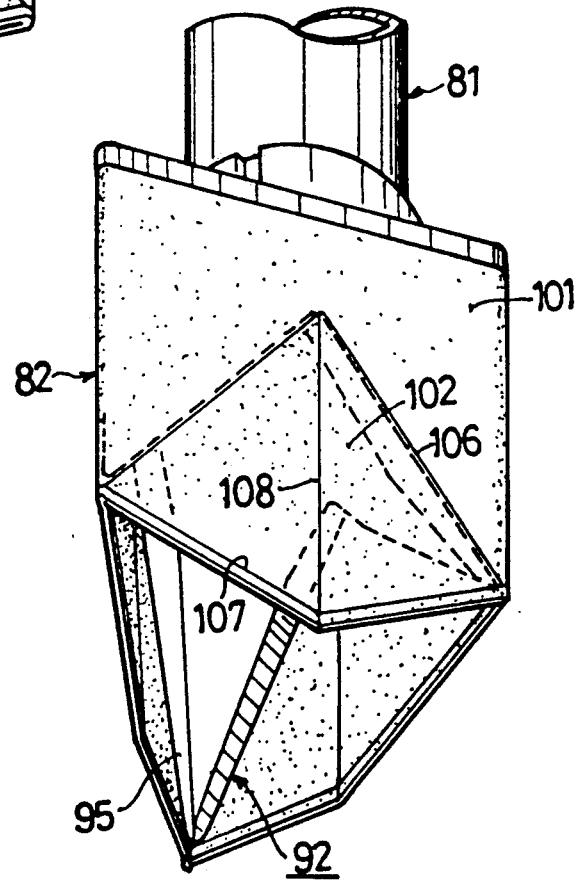
Figure 9:
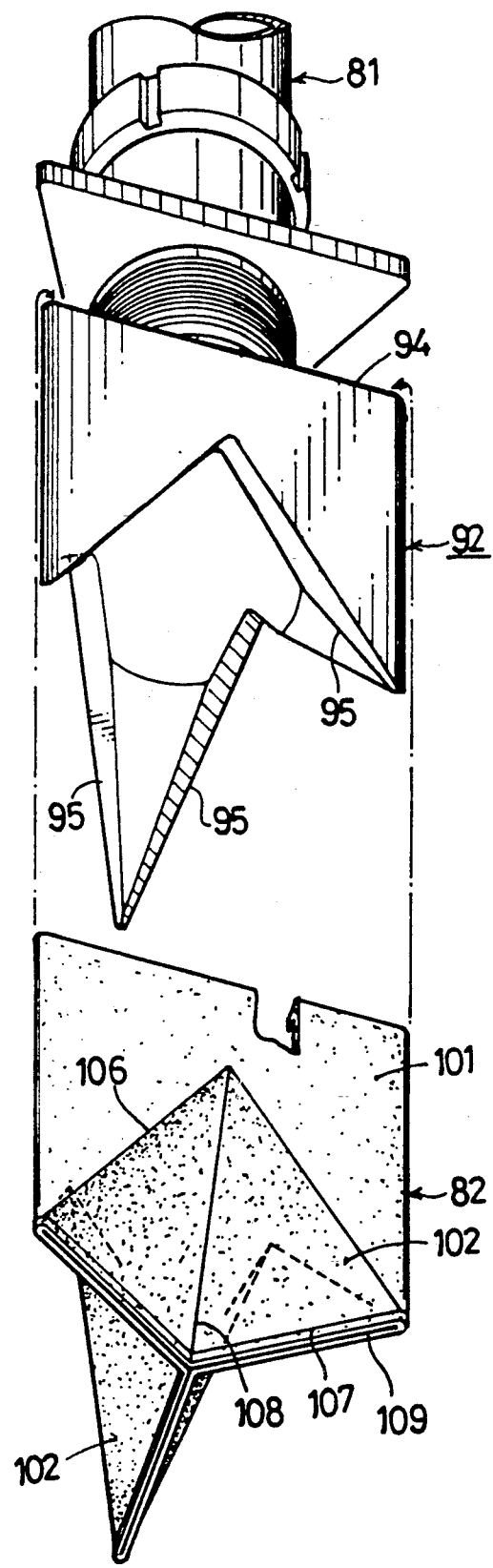

FIGS. 7 to 9 show still another embodiment, which comprises a nozzle body 81 and a rubber tube 82 like the foregoing two embodiments. The outer surface of a tube holding portion 92 comprises three falt faces 94 which form a triangular contour in cross section. The tube holding portion 92 is formed at its lower part with three inverted V-shaped cutouts 95. The rubber tube 82 comprises three flat portions 101 fitted over the tube holding portion 92 in intimate contact therewith and internally in conformity with the three flat faces 94, respectively, and three inward folded portions 102 extending from the lower edges of the respective flat portions 101 with an inverted V-shaped fold 106 formed therebetween and each extending into the cutout 95. As in the foregoing embodiments, each inward folded portion 102 is formed with a horizontal fold 107 and a vertical fold 108. The rubber tube 82 is provided at its lower end with separable radial joints 109 extending outward in three directions.

What is claimed is:

1. A filling nozzle comprising:
   a vertical tubular nozzle body for receiving liquid to be filled and supplied thereto forcibly and intermittently;
   a rubber tube connected to a lower end of the nozzle body and having a lower open end, the rubber tube being folded at folded portions to constrict the lower open end, said lower open end having joints extending radially from a center axis of the rubber tube, the joints to be held closed by elasticity of the rubber tube against gravity acting on the liquid within the nozzle body when a supply of the liquid is discontinued, the joints being openable by pressure of the liquid when the liquid is supplied to the nozzle body; and
   a tube holding portion having the rubber tube fitted thereover for holding the rubber tube in shape, the tube holding portion having an annular upper half portion having an outer surface engaging with an upper inner surface of the rubber tube and said tube holding portion having a lower half portion having inverted V-shaped cutouts, a number of said V-shaped cutouts corresponding to a number of the joints, said lower half portion reaching end portions of the joints, wherein the tube holding portion is externally in conformity with the inner surface of the rubber tube except at the folded portions.

2. A filling nozzle as defined in claim 1 wherein an outer surface of the lower half portion of the tube holding portion comprises four flat faces forming a square contour in cross section, each of the four flat faces being formed with said inverted V-shaped cutout, and the rubber tube comprises four flat portions internally in conformity with the four external faces of the lower half portion of the tube holding portion, and four inward folded portions extending from lower edges of respective flat portions and each extending into the respective V-shaped cutout.

3. A filling nozzle as defined in claim 2 wherein an inverted V-shaped fold is formed at a boundary between each flat portion of the rubber tube and the inward folded portion adjacent thereto, a horizontal fold being formed along a lower edge of each inward folded portion, a vertical fold extending from a vertex of the inverted V-shaped fold to a midpoint of the horizontal fold, the rubber tube being so folded that lengthwise midportions of the lower edges of the four inward folded portions are collectively positioned on the center axis of the rubber tube, with half lengths of the lower edges of adjacent inward folded portions fitted to each other on respective inner faces, whereby forming said joints.

4. A filling nozzle as defined in claim 1 wherein the lower half portion of the tube holding portion has a cylindrical outer surface circular in cross sectional contour and is formed at a lower part with four said inverted V-shaped cutouts continuous with one another, and the rubber tube comprises a cylindrical portion internally in conformity with the cylindrical outer surface of the lower half portion of the tube holding portion, and four said inward folded portions extending from a lower edge of the cylindrical portion and each extending into the respective V-shaped cutout.

5. A filling nozzle as defined in claim 4 wherein an inverted V-shaped fold is formed at a boundary between the cylindrical portion of the rubber tube and each inward folded portion thereof, a horizontal fold being formed along a lower edge of each inward folded portion, a vertical fold extending from a vertex of the inverted V-shaped fold to a midportion of the horizontal fold, the rubber tube being so folded that lengthwise midportions of lower edges of the four inward folded portions are collectively positioned on the center axis of the rubber tube, with half lengths of the lower edges of adjacent inward folded portions fitted to each other on respective inner faces, whereby forming said joints.

6. A filling nozzle as defined in claim 1 wherein an outer surface of the lower half portion of the tube holding portion comprises three flat faces forming a triangular contour in cross section, each of the three flat faces being formed with said inverted V-shaped cutout, and the rubber tube comprises three flat portions internally in conformity with the three external faces of the lower half porton of the tube holding portion, and three said inward folded portions extending from lower edges of respective flat portions and each extending into the respective V-shaped cutout.

7. A filling nozzle as defined in claim 6 wherein an inverted V-shaped fold is formed at a boundary between each flat portion of the rubber tube and the inward folded portion adjacent thereto, a horizontal fold being formed along a lower edge of each inward folded portion, a vertical fold extending from a vertex of the inverted V-shaped fold to a midpoint of the horizontal fold, the rubber tube being so folded that lengthwise midportions of lower edges of the three inward folded portions are collectively positioned on the center axis of the rubber tube, with half lengths of the lower edges of adjacent inward folded portions fitted to each other on respective inner faces, whereby forming said joints.

* * * * *